United States Patent
Kulprathipanja et al.

(10) Patent No.: US 9,663,722 B2
(45) Date of Patent: May 30, 2017

(54) FLUID CATALYTIC CRACKING APPARATUS AND METHODS FOR CRACKING HYDROCARBONS

(71) Applicant: UOP LLC, Des Plaines, IL (US)

(72) Inventors: Sathit Kulprathipanja, Schaumburg, IL (US); Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 270 days.

(21) Appl. No.: 14/538,407

(22) Filed: Nov. 11, 2014

(65) Prior Publication Data
US 2016/0129413 A1 May 12, 2016

(51) Int. Cl.
| | |
|---|---|
| *C10G 11/05* | (2006.01) |
| *B01J 8/34* | (2006.01) |
| *B01J 8/26* | (2006.01) |
| *B01J 8/00* | (2006.01) |
| *B01J 8/02* | (2006.01) |

(52) U.S. Cl.
CPC ............ *C10G 11/05* (2013.01); *B01J 8/0055* (2013.01); *B01J 8/0257* (2013.01); *B01J 8/26* (2013.01); *B01J 8/34* (2013.01); *B01J 2208/00752* (2013.01); *B01J 2208/00761* (2013.01)

(58) Field of Classification Search
CPC ............ B01J 8/005; B01J 2208/00752; B01J 2208/0076; C10G 11/05
See application file for complete search history.

(56) References Cited

U.S. PATENT DOCUMENTS

| | | | |
|---|---|---|---|
| 4,219,407 A | 8/1980 | Haddad et al. | |
| 4,701,307 A | 10/1987 | Walters et al. | |
| 5,284,575 A * | 2/1994 | Owen | C10G 11/18 208/113 |
| 5,390,612 A | 2/1995 | Toth | |
| 5,869,008 A | 2/1999 | Dewitz | |
| 6,248,298 B1 | 6/2001 | Senior et al. | |

FOREIGN PATENT DOCUMENTS

| | | |
|---|---|---|
| RU | 2505584 C2 | 2/1984 |
| SU | 777050 A | 11/1980 |
| SU | 353467 A | 2/1984 |
| WO | 2010101686 A2 | 9/2010 |

OTHER PUBLICATIONS

Wendt, FCC Spent Catalyst Stripper Technology, Coking and CatCracking Conference, New Delhi, Oct. 2013.
The International Search Report mailed May 12, 2016 in International Application No. PCT/US2015/059199.

* cited by examiner

Primary Examiner — Randy Boyer
Assistant Examiner — Juan Valencia

(57) ABSTRACT

Methods and FCC apparatuses are provided for cracking hydrocarbons. An FCC apparatus includes a riser with a riser outlet positioned within a reactor catalyst collection area. A stripper is coupled to the reactor catalyst collection area, where the riser extends through the stripper, and where the stripper includes a stripper exterior wall. A sleeve is positioned within the stripper between the riser and the stripper exterior wall.

20 Claims, 4 Drawing Sheets

FLUID CATALYTIC CRACKING APPARATUS AND METHODS FOR CRACKING HYDROCARBONS

TECHNICAL FIELD

The present disclosure generally relates to fluid catalytic cracking apparatuses and methods for cracking hydrocarbons, and more particularly relates to revamping fluid catalytic cracking apparatuses having strippers with reduced cross sectional areas to reduce equipment costs, utility costs, and achieve revamp capacity targets.

BACKGROUND

Fluid catalytic cracking (FCC) is primarily used to convert high boiling, high molecular weight hydrocarbons from petroleum into lower boiling, lower molecular weight compounds. The lower molecular weight compounds include gasoline, olefinic compounds, liquid petroleum gas (LPG), diesel fuel, etc., where the feedstock and the operating conditions can be adjusted to improve yields of a desired product. In an FCC apparatus, hydrocarbons are cracked with a catalyst in a riser, coke deposits on the catalyst in the riser, and the coke is burned in a regenerator to regenerate the catalyst. The catalyst is repeatedly cycled through the riser and regenerator during the cracking process.

FCC apparatuses typically include a stripper section that strips hydrocarbons from the spent catalyst before transferring the spent catalyst to the regenerator. The stripper is typically located at the bottom of a catalyst collection area for the riser. FCC apparatuses and the associated strippers are sized for target residence times and mass fluxes. Steam is supplied to the bottom of the stripper in sufficient volume to strip valuable hydrocarbon products from the catalyst via counter current flow, and also to fluidize the spent catalyst. Due to business reasons, sometimes the unit capacity and flow rate of catalyst to the stripper is lowered below the designed flow rate. When the catalyst flow rates decrease to a level much lower than the designed flow rates, higher steam to catalyst ratios are required to maintain sufficient stripping efficiency and to fluidize the catalyst in the stripper. The excess steam increases the gas and liquid load on equipment connected to the stripper. For example, the excess steam can increase the quantity of sour water produced per pound of hydrocarbon processed, as well as increase the operating costs for processing the excess steam. The reactor stripper is often filled with packing or distribution trays that distribute the spent catalyst as it flows through the stripper, and the excess volume of oversized strippers increases the capital costs for installing the packing or distribution trays.

Accordingly, it is desirable to provide FCC apparatuses and methods that require less steam to strip hydrocarbons from the spent catalyst in the stripper. In addition, it is desirable to provide FCC apparatuses and methods that reduce the cross sectional area and the volume of the stripper and thereby reduce the catalyst inventory and the packing or distribution trays in the stripper. Furthermore, other desirable features and characteristics of the present embodiment will become apparent from the subsequent detailed description and the appended claims, taken in conjunction with the accompanying drawing and this background.

BRIEF SUMMARY

FCC apparatuses and methods are provided for cracking hydrocarbons. In an exemplary embodiment, the FCC apparatus includes a riser with a riser outlet positioned within a reactor catalyst collection area. A stripper is coupled to the reactor catalyst collection area, where the riser extends through the stripper, and where the stripper includes a stripper exterior wall. A sleeve is positioned within the stripper between the riser and the stripper exterior wall.

In another embodiment, an FCC apparatus includes a riser with a riser outlet positioned within a reactor catalyst collection area. The reactor catalyst collection area includes a catalyst collection area sloped wall. A stripper is coupled to the reactor catalyst collection area sloped wall, and a sleeve sloped section is coupled to the catalyst collection area sloped wall such that the sleeve extends into the stripper.

In another embodiment, a method is provided for cracking hydrocarbons. The method includes contacting a hydrocarbon stream with a catalyst in a riser at cracking conditions to produce a riser effluent. The riser effluent is separated from the catalyst in a reactor catalyst separator, and the catalyst is collected in a reactor catalyst collection area. Hydrocarbons are stripped from the catalyst in a stripper, where the stripper includes a space between a sleeve and a stripper exterior wall that is filled with a non-reactive material.

BRIEF DESCRIPTION OF THE DRAWINGS

Various embodiments will hereinafter be described in conjunction with the following drawing figures, wherein like numerals denote like elements, and wherein.

DETAILED DESCRIPTION

The following detailed description is merely exemplary in nature and is not intended to limit the application or uses of the embodiment described. Furthermore, there is no intention to be bound by any theory presented in the preceding technical field, background, brief summary, or the following detailed description.

In accordance with various exemplary embodiments described herein, an FCC apparatus and methods of cracking hydrocarbons are provided. The FCC apparatus includes a stripper positioned at the bottom of a reactor catalyst collection area, where the reactor catalyst collection area is positioned to collect spent catalyst from a riser. The stripper is positioned between the riser and a stripper exterior wall positioned about the riser. The volume and cross sectional area of the stripper are reduced with a sleeve positioned between the riser and the stripper exterior wall, such that catalyst flows between the sleeve and the riser. The area between the sleeve and the stripper exterior wall is filled with a non-reactive material to prevent accumulation of hydrocarbons or coke.

Figure 1:
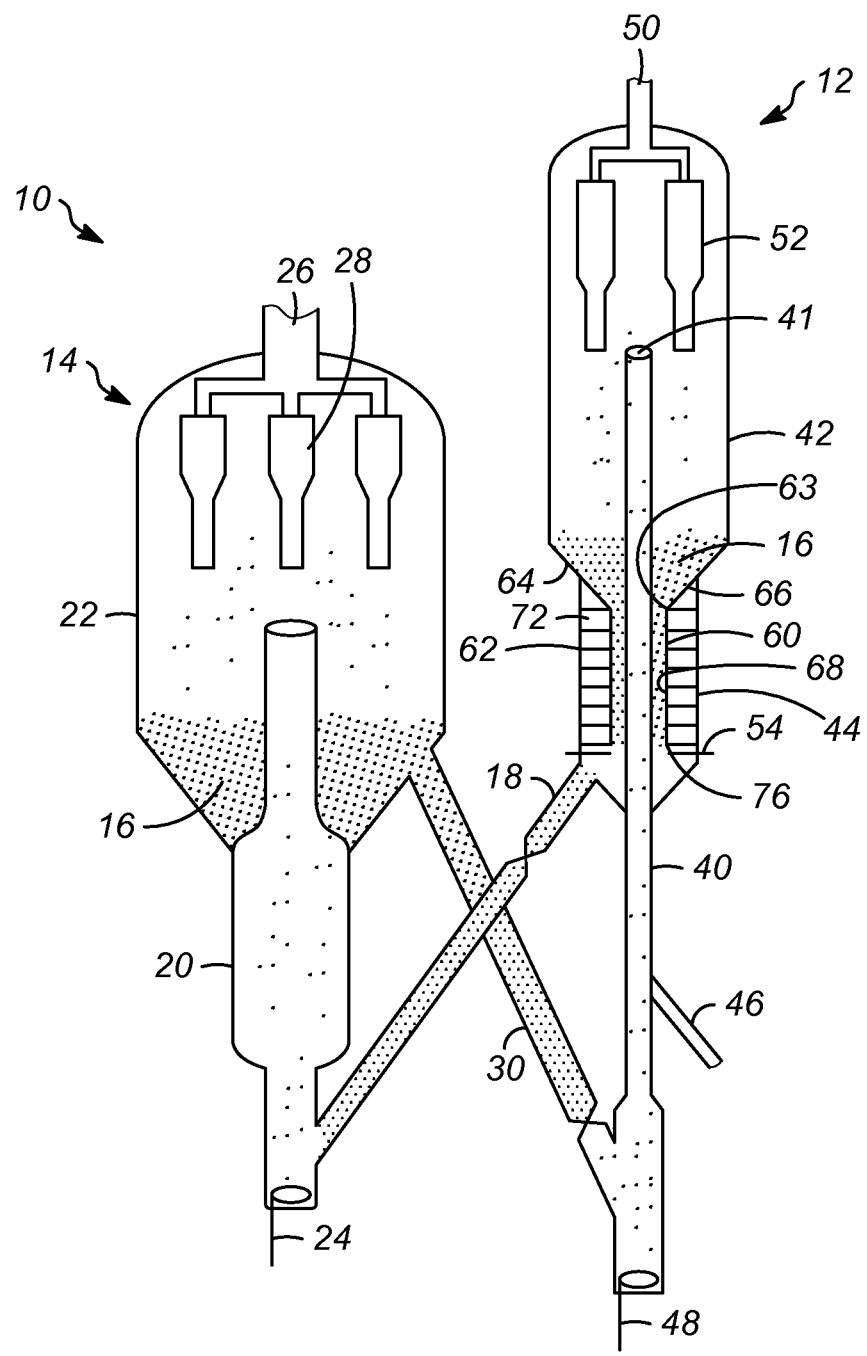
FIG. 1 is a cross-sectional view of a fluid catalytic cracking apparatus used in an FCC process in accordance with exemplary embodiments.

In accordance with an exemplary embodiment and referring to FIG. 1, an FCC apparatus 10 includes a reactor 12 and a regenerator 14 fluidly coupled together. Catalyst 16 that is spent is transferred from the reactor 12 to the regenerator 14 in a spent catalyst transfer line 18. The catalyst 16 can be a wide variety of cracking catalysts 16 as is known in the art. Suitable catalysts 16 for use herein include high activity crystalline alumina silicate and/or zeolite, which may be dispersed in a porous inorganic carrier material such as silica, alumina, zirconia, or clay. An exemplary embodiment of a catalyst 16 includes crystalline zeolite as the primary active component, a matrix, a binder, and a filler. The zeolite ranges from about 10 to about 50 mass percent of the catalyst 16, and is a silica and alumina tetrahedral with a lattice structure that limits the size range of hydrocarbon molecules that can enter the lattice. The matrix component includes amorphous alumina, and the binder and filler provide physical strength and integrity. Silica sol or alumina sol are used as the binder and kaolin clay is used as the filler. Different cracking catalysts 16 may be used in alternate embodiments. As used herein, the term "spent catalyst" or "catalyst that is spent" refers to catalyst 16 with about 0.7 weight percent or greater of coke on the catalyst 16. The term "regenerated catalyst" or "catalyst that is regenerated" refers to catalyst 16 with about 0.2 weight percent or less of coke on the catalyst 16.

The spent catalyst 16 from the reactor 12 is transferred to the regenerator 14 where deposited coke will be removed, thereby regenerating the catalyst 16. In this regard, the reactor 12 is fluidly coupled to the regenerator 14 by the spent catalyst transfer line 18. Coke is removed, i.e., burned off, the spent catalyst 16 in a coke combusting zone 20 of the regenerator 14. The regenerated catalyst 16 is then collected in a regenerator separation area 22. An oxygen supply gas 24 is coupled to the coke combusting zone 20 and fluidizes and carries the catalyst 16 through the coke combusting zone 20 into the regenerator separation area 22. The coke is burned off the spent catalyst 16 by contact with oxygen from the oxygen supply gas 24 at regeneration conditions. In an exemplary embodiment, air is used as the oxygen supply gas 24 because air is readily available and provides sufficient oxygen for combustion, but other gases with a sufficient concentration of oxygen could also be used, such as purified oxygen. If air is used as the oxygen supply gas 24, about 10 to about 15 kilograms (kg) of dry air is required per kg of coke burned off of the catalyst 16. Exemplary regeneration conditions include a temperature from about 650° C. to about 760° C. and a pressure of about 100 kilopascals gauge (kPa) to about 350 kPa. The superficial velocity of the gas in the coke combustion zone 20 is about 1.5 meters per second, and the density within the coke combusting zone 20 is about 80 to about 400 kg per cubic meter. However, the regenerator 14 may be designed and sized based on the expected duty, so the regenerator 14 operating conditions may vary from those described above.

Combustion gases, such as carbon dioxide, carbon monoxide, and water are produced as the coke is burned off. The combustion gases and other excess gases may be vented from the regenerator separation area 22 through a regenerator vent line 26. In an exemplary embodiment, a regenerator catalyst separator 28 aids in separating the regenerated catalyst 16 from the combustion gases before the combustion gases are vented. The regenerator catalyst separator 28 may include one or more cyclones, impingement separators, or other gas/solid separators in various embodiments. The combustion of coke is an exothermic reaction, so the catalyst 16 is heated as it is regenerated, and the regenerated catalyst 16 in the regenerator separation area 22 is hotter than the spent catalyst 16 in the spent catalyst transfer line 18. In an exemplary embodiment, the regenerated catalyst 16 in the regenerator separation area 22 has a temperature of about 670° C. to about 760° C. The regenerated catalyst 16 is then transferred to the reactor 12 in a regenerated catalyst transfer line 30 that fluidly couples the regenerator 14 to the reactor 12.

The reactor 12 includes a riser 40, a reactor catalyst collection area 42, and a stripper 44 coupled to the reactor catalyst collection area 42. In some embodiments, the riser 40 extends through the stripper 44 to a riser outlet 41 positioned within the reactor catalyst collection area 42. In other embodiments, the stripper 44 is external to the riser 40 (not illustrated), so the riser 40 does not pass through the stripper 44. The riser outlet 41 is still positioned within the reactor catalyst collection area 42, but the stripper 44 is adjacent to the riser 40 instead of encasing the riser 40. A hydrocarbon stream 46 is introduced to the riser 40 for cracking. The hydrocarbon stream 46 is a petroleum product in an exemplary embodiment, but the hydrocarbon stream 46 may alternatively be a natural oil, a chemical by-product, or other materials in alternate embodiments. Suitable hydrocarbon feedstocks for the hydrocarbon stream 46 include, but are not limited to, petroleum products such as vacuum gas oil (VGO), hydrotreated VGO, atmospheric distillation column bottoms, demetallized oil, deasphalted oil, hydrocracker main column bottoms, Fischer-Tropsch liquids derived from renewable or non-renewable feedstocks, triglycerides of vegetable or animal origin, and the like. In some embodiments, the hydrocarbon stream 46 has an initial boiling point of about 300 degrees centigrade (° C.) or higher (at atmospheric pressure), and includes material that can vaporize and flow, but other boiling range materials can also be used. In many embodiments, the hydrocarbon stream 46 will be a mixture of different compounds, so it will have a boiling range instead of a single boiling point, where the boiling range begins at the initial boiling point described above. In some embodiments, the hydrocarbons have an average molecular weight of about 200 to about 600 Daltons or higher, but other average molecular weight ranges can also be used.

The hydrocarbons from the hydrocarbon stream 46 are discharged into a low portion of the riser 40, where the hydrocarbons in the hydrocarbon stream 46 primarily react (crack) in the riser 40. The hydrocarbons are vaporized and carried up through the riser 40 with the catalyst 16. Regenerated catalyst 16 is transferred to the riser 40 through the regenerated catalyst transfer line 30, so the regenerator 14 is fluidly coupled to the riser 40. The catalyst 16 is fluidized in the riser 40 by a lift gas stream 48, where the lift gas stream 48 may include one or more of steam, light hydrocarbons, nitrogen, or other gases. The hydrocarbon stream 46 is typically introduced into the riser 40 as a liquid, and the hydrocarbons are vaporized by heat from the hot catalyst 16 coming from the regenerator separation area 22 through the regenerated catalyst transfer line 30. As the vaporized hydrocarbons and catalyst 16 rise up through the riser 40, the hydrocarbons are contacted with the catalyst 16 and cracked into smaller hydrocarbons. The catalyst 16, the gas from the lift gas stream 48, and the hydrocarbons from the hydrocarbon stream 46, including those that were cracked and any hydrocarbons that were not cracked, are discharged from the riser 40 at the riser outlet 41 within the reactor catalyst collection area 42.

In an exemplary embodiment, the riser 40 operates at a cracking temperature of from about 480° C. to about 570° C. Operating pressures in the riser 40 may be from about 100 kPa to about 340 kPa. More severe operating conditions (higher temperatures) tend to produce smaller molecules with lower boiling points, and less severe operating conditions tend to produce larger molecules with higher boiling points, such as diesel fuel. The operating conditions may vary depending on several factors, including but not limited to the feedstock in the hydrocarbon stream 46, the catalyst 16, residence time in the riser 40, catalyst loading in the riser 40, the desired product, etc. The riser 40 is generally designed for a given feedstock and production rate, so the size, flow rate, and proportions can vary widely. In an exemplary embodiment, the riser 40 is designed for a hydrocarbon stream 46 residence time from about 0.5 to about 10 seconds, but other residence times are also possible. The hydrocarbon stream 46 may be heated to a temperature of from about 150° C. to about 310° C. before entry into the riser 40.

In an exemplary embodiment, the hydrocarbon stream 46 and catalyst 16 travel up the riser 40 to the reactor catalyst collection area 42 fluidly coupled to the riser 40. The vaporous hydrocarbon reactor products 50 exit the top of the reactor catalyst separator 52, and the catalyst 16 exits the bottom of the reactor catalyst separator 52 and enters the stripper 44, where the stripper 44 is typically coupled to a bottom portion of the reactor catalyst collection area 42. Coke is deposited on the catalyst 16 in the riser 40 such that the catalyst 16 is at least partially coated with coke when exiting the riser outlet 41. The catalyst 16 is separated from the reactor product 50 in a reactor catalyst separator 52, which may be one or more cyclones, impingement separators, or other gas/solid separators. The spent catalyst 16 falls downward from the reactor catalyst collection area 42 to the stripper 44, and the reactor product 50 is discharged to a fractionation area (not illustrated) and further processed or otherwise used. The spent catalyst 16 travels through the stripper 44 to the spent catalyst transfer line 18 and then to the regenerator 14, so the regenerator 14 is fluidly coupled to the stripper 44 and the reactor catalyst collection area 42 by the spent catalyst transfer line 18.

Figure 2:
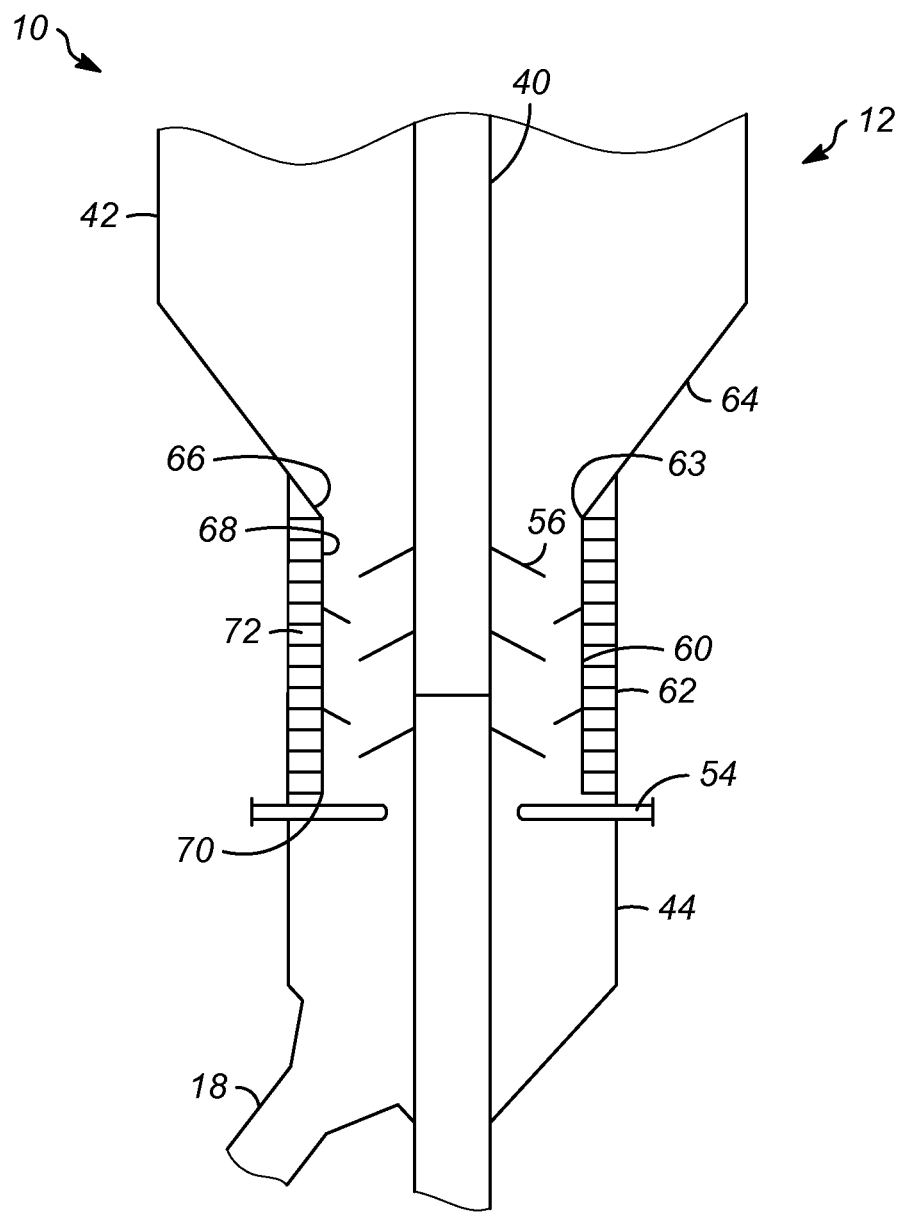
FIGS. 2-4 are cross sectional views of stripper sections of fluid catalytic cracking apparatuses used in FCC processes in accordance with exemplary embodiments.

Referring to FIG. 2 and with continuing reference to FIG. 1, some hydrocarbons tend to remain entrained within the catalyst 16 as the catalyst 16 falls to the bottom of the reactor catalyst collection area 42. A stripper gas, such as steam or other inert gases, are discharged from a stripper gas distributor 54 and flow upward through the stripper 44 and into the reactor catalyst collection area 42. The stripper gas strips hydrocarbons from the catalyst 16 as the catalyst 16 passes through the stripper 44, and the stripped hydrocarbons travel upward through the stripper 44 to the reactor catalyst collection area 42 and eventually into the reactor product 50. The stripper 44 often includes flow aids 56 such as baffles, plates, or packing to direct the catalyst 16 in a desired flow path within the stripper 44 to increase the contact between the rising stripper gas and the falling catalyst 16. In an exemplary embodiment, steam from the stripper gas distributor 54 is added in a sufficient quantity to fluidize the catalyst 16 in the stripper 44. The steam exits the reactor catalyst collection area 42 with the reactor product 50. The steam is later separated from the hydrocarbons and contributes to a sour water stream (not illustrated) or other process streams that are separated and/or treated in downstream process units. Steam condenses to form water, and water is generally not desired with the hydrocarbons produced in the reactor 12.

The amount of catalyst 16 used in the reactor 12 can change for various reasons. The ratio of the catalyst 16 to the hydrocarbons from the hydrocarbon stream 46 is typically controlled to within a desired range, but this ratio can change for various reasons, such as different catalysts 16 or manufacturing processes that favor different products. The quantity and quality of hydrocarbon treated in the reactor 12 may be reduced for various reasons, such as supply and demand or other reasons. As a result, the quantity of catalyst 16 flowing through the stripper 44 can change and fall below the designed catalyst loading ratio for the stripper 44. When the quantity of catalyst 16 falls below design ratios, the stripper gas to catalyst ratio is typically increased to provide sufficient steam to strip hydrocarbons from the catalyst 16 and to fluidize the catalyst 16 in the stripper 44, where the steam is from the stripper gas distributor 54. The increased ratio of steam to catalyst 16 increases the steam/water load on downstream equipment relative to the amount of hydrocarbons processed, and this increases the relative operating costs for processing the hydrocarbons. The amount of steam required to fluidize the catalyst 16 in the stripper 44 can be reduced by reducing the horizontal cross sectional area of the stripper 44. A reduced horizontal cross sectional area in the stripper 44 means there is less area where steam fluidizes the catalyst 16, so a lower total amount of steam can be used. When the catalyst loading in the stripper 44 is reduced, the lower amount of steam from a reduced horizontal cross sectional area can lower the steam to catalyst ratio and thereby reduce operating costs and the load on downstream equipment. In embodiments with a stripper gas other than steam, the reduced horizontal cross sectional area can reduce the load on downstream equipment by reducing the amount of stripper gas used in the stripper 44.

The horizontal cross sectional area of the stripper 44 can be reduced by adding a sleeve 60 positioned between the riser 40 and a stripper exterior wall 62, where the stripper exterior wall 62 is the outermost surface of the stripper 44. In embodiments where the riser 40 does not pass through the stripper 44 (not illustrated), the sleeve 60 is positioned within the stripper 44 with a sleeve diameter less than a stripper exterior wall diameter. In an exemplary embodiment, the reactor catalyst collection area 42 has a catalyst collection area sloped wall 64 at a bottom of the reactor catalyst collection area 42, where the catalyst collection area sloped wall 64 is configured to direct collected catalyst 16 to a top opening of the stripper 44. The top opening of the stripper 44 is at the intersection of the catalyst collection area sloped wall 64 and the vertical stripper exterior wall 62, so the reactor catalyst collection area 42 ends and the stripper 44 begins at an outer vertex 63 formed by the catalyst collection area sloped wall 64 and the stripper exterior wall 62. In some embodiments, the sleeve 60 includes a sleeve sloped section 66, a sleeve vertical section 68, and a sleeve bottom end 70. The sleeve vertical section 68 may be significantly longer than the sleeve sloped section 66, such as about 10 times longer or more, or about 20 times longer or more, or about 50 times longer or more in various embodiments. In an embodiment, the sleeve sloped section 66 is coupled to the catalyst collection area sloped wall 64 at about the same slope angle as the catalyst collection area sloped wall 64, such that the intersection of the sleeve 60 and the catalyst collection area sloped wall 64 defines about a straight line. For example, the slope of the sleeve sloped section 66 may be about −5 to about +5 degrees from the slope of the catalyst collection area sloped wall 64. This straight line facilitates the flow of catalyst 16 from the reactor catalyst collection area 42 into the stripper 44. The sleeve sloped section 66 extends into the stripper 44, because the sleeve sloped section 66 angles downwardly from the reactor catalyst collection area 42 to an area vertically between the riser 40 and the stripper exterior wall 62. The sleeve 60 may be welded or otherwise affixed to the reactor catalyst collection area 42 at the intersection of the sleeve 60 and the catalyst collection area sloped wall 64, and the sleeve bottom end 70 may float within the stripper 44 to allow for thermal expansion. The term "float" means the sleeve bottom end 70 is not welded or otherwise affixed to the stripper 44 at the sleeve bottom end 70. The sleeve 60 may be formed from the same or similar material as the stripper flow aid 56.

The sleeve 60 divides the stripper 44 into two different sections: the annular space between the sleeve 60 and the riser 40, and the annular space between the sleeve 60 and the stripper exterior wall 62. In embodiments where the riser 40 does not pass through the stripper 44 (not illustrated), the sleeve 60 divides the stripper 44 into the annular space between the sleeve 60 and the stripper exterior wall 62, and the space within the sleeve 60 (which may be cylindrical in some embodiments.) In an exemplary embodiment, the annular space between the sleeve 60 and the riser 40 (or the space within the sleeve 60) functions as the reduced cross-sectional area stripper 44, whereas the annular space between the sleeve 60 and the stripper exterior wall 62 is a "dead space" with little or no flow. In an exemplary embodiment, this "dead space" is filled with a non-reactive material, where the filling can minimize or prevent any buildup of coke or hydrocarbons that could develop if the "dead space" were left open. In an exemplary embodiment, a refractory material 72 is positioned in the annular space between the sleeve 60 and the stripper exterior wall 62, and this space may also or alternatively include ceramic fiber blankets and/or other non-reactive packing materials capable of withstanding the conditions within the stripper 44.

The annular space between the sleeve 60 and the riser 40 may be filled with a flow aid 56, such as the distribution plates illustrated in FIG. 2. In alternate embodiments where the riser 40 does not pass through the stripper 44 (not illustrated), the space within the sleeve 60 may be filled with a flow aid 56. Embodiments with the riser 40 passing through the stripper 44 are described and illustrated herein, but embodiments with the riser 40 exterior to the stripper 44 are also contemplated, as understood by those skilled in the art. The flow aid 56 may be reduced in size compared to a flow aid 56 for a stripper 44 extending from the riser 40 to the stripper exterior wall 62, so the equipment revamping capital costs to install the flow aid 56 may be reduced when the sleeve 60 is in place compared to the capital cost without the sleeve 60. Other flow aids 56 may be used in alternate embodiments with a similar savings in capital costs.

The stripper gas distributor 54 may be positioned below the sleeve bottom end 70, and the stripper gas distributor 54 may be configured to discharge steam or other stripping gas into the open annular space between the riser 40 and the sleeve 60, but not to discharge stripping gas into the refractory material 72 or the annular space between the sleeve 60 and the stripper exterior wall 62. In alternate embodiments, the stripper gas distributor 54 extends upward past the sleeve bottom end 70 and into the annular space between the riser 40 and the sleeve 60.

Figure 3:
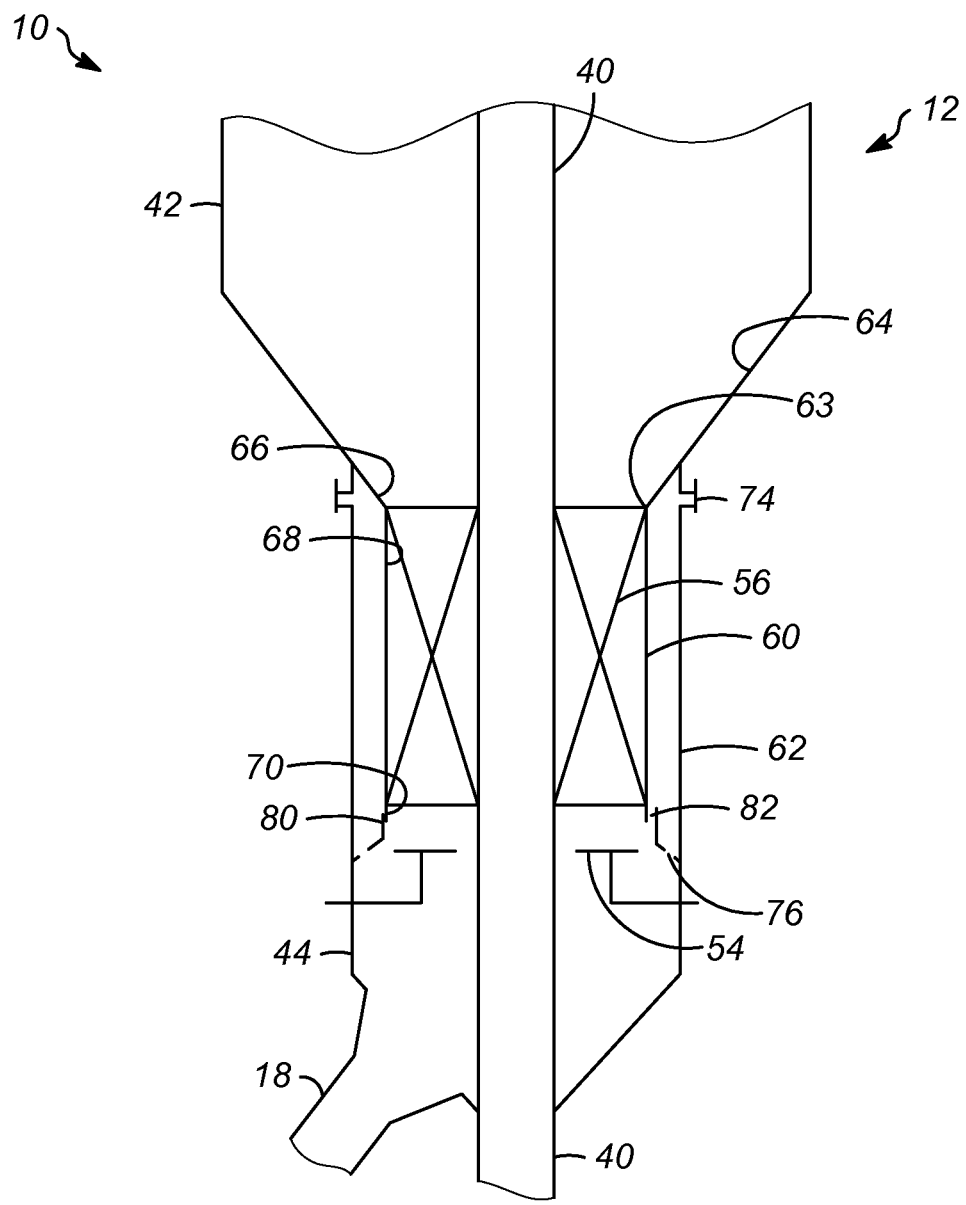
Figure 4:
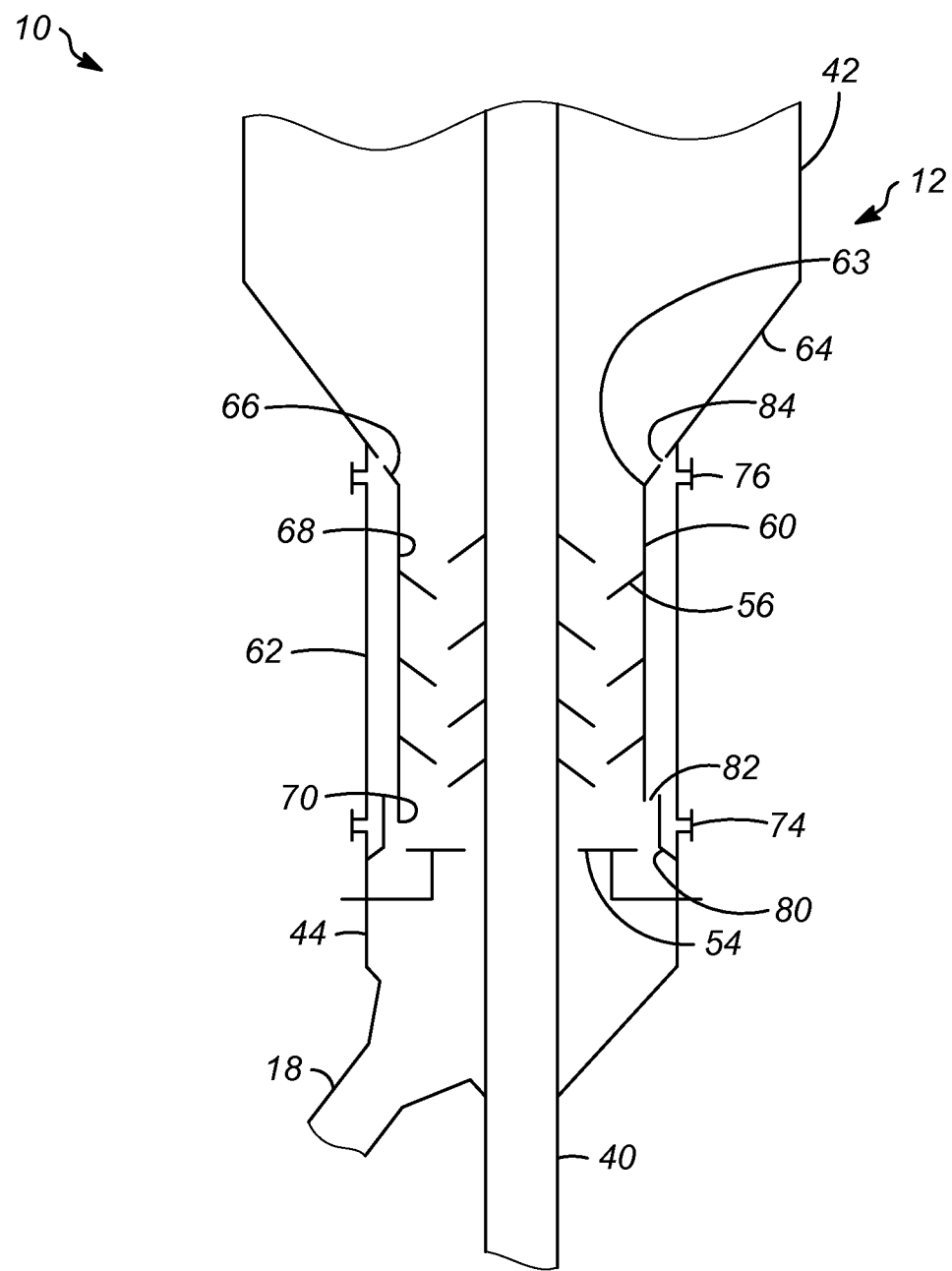

An alternate embodiment of the sleeve 60 is illustrated in FIG. 3, with continuing reference to FIG. 1. In FIG. 3, the flow aid 56 is a packing material, as understood by those skilled in the art, and the annular "dead space" between the sleeve 60 and the stripper exterior wall 62 is purged with a non-reactive material. As such, a purge material fills the annular space between the sleeve 60 and the stripper exterior wall 62. A purge inlet 74 is positioned in the space between the sleeve 60 and the stripper exterior wall 62, where the purge inlet 74 may be coupled to a steam supply (not illustrated). The purge inlet 74 may be positioned nearer the sleeve sloped section 66 than the sleeve bottom end 70, as illustrated in FIG. 3, or the purge inlet 74 may be positioned nearer the sleeve bottom end 70 than the sleeve sloped section 66 as illustrated in FIG. 4, with continuing reference to FIGS. 1 and 3. In an exemplary embodiment, steam is used for the purge, but other non-reactive materials could be used in alternate embodiments, such as nitrogen gas or other inert gases. The "dead space" between the sleeve 60 and the stripper exterior wall 62 may have fluid flow in embodiments with a purge, but the "dead space" is not used to strip hydrocarbons from the catalyst 16.

Reference is made to FIGS. 3 and 4, with continuing reference to FIG. 1. A slip joint may be formed by a bather wall 80 and the sleeve 60, where the barrier wall 80 is welded or otherwise affixed to the stripper exterior wall 62 near the sleeve bottom end 70. A sleeve bottom gap 82 is defined between the sleeve 60 at the sleeve bottom end 70 and the barrier wall 80. The barrier wall 80 isolates the "dead space" between the sleeve 60 and the stripper exterior wall 62 to facilitate the purge of this area, and to minimize unintended entry of hydrocarbons, catalyst 16, or other materials. A purge outlet 76 may be defined in the barrier wall 80, as illustrated in FIG. 3, or the purge outlet 76 may be defined in the stripper exterior wall 62 in the annular space defined by the stripper exterior wall 62, the sleeve 60, and the barrier wall 80, as illustrated in FIG. 4. In some embodiments, the purge outlet 76 is between the sleeve 60 and the stripper exterior wall 62, but the purge outlet 76 could also be positioned below the sleeve bottom end 70 and between the stripper exterior wall 62 and the barrier wall 80. The purge can flow upwards or downwards through the "dead space" between the sleeve 60 and the stripper exterior wall 62 in various embodiments. Purge gas exiting the sleeve bottom gap 82 can flow upwardly into the annular space between the riser 40 and the sleeve 60 to provide some of the stripping gas requirements.

In an exemplary embodiment illustrated in FIG. 4, with continuing reference to FIG. 1, one or more perforated holes 84 are defined in the sleeve sloped section 66. Steam or other gases from the purge can flow from the "dead space" into the reactor catalyst collection area 42 through the perforated holes 84, Purge gas flowing through the perforated holes 84 can fluidize and facilitate catalyst flow down the catalyst collect area sloped wall 64 and the connected sleeve sloped section 66. As explained above, the sleeve 60 may be useful in reducing the effective horizontal cross sectional area of the stripper 44 for operations with reduced catalyst flow, and as such can reduce the operating expenses and capital costs compared to operations without the sleeve 60.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

The invention claimed is:
1. A fluid catalytic cracking apparatus comprising:
a riser comprising a riser outlet;
a reactor catalyst collection area, wherein the riser outlet is positioned within the reactor catalyst collection area;
a stripper coupled to the reactor catalyst collection area, wherein the riser extends through the stripper, and wherein the stripper comprises a stripper exterior wall;

a sleeve positioned within the stripper between the riser and the stripper exterior wall; and a refractory material, ceramic fiber blanket and/or other non-reactive packing material positioned between the sleeve and the stripper exterior wall.

2. The fluid catalytic cracking apparatus of claim 1 further comprising:

a refractory material positioned between the sleeve and the stripper exterior wall.

3. The fluid catalytic cracking apparatus of claim 1 further comprising:

a ceramic fiber blanket positioned between the sleeve and the stripper exterior wall.

4. The fluid catalytic cracking apparatus of claim 1 further comprising:

a purge inlet positioned between the sleeve and the stripper exterior wall.

5. The fluid catalytic cracking apparatus of claim 4 further comprising:

a steam supply fluidly coupled to the purge inlet.

6. The fluid catalytic cracking apparatus of claim 4 further comprising:

a barrier wall affixed to the stripper exterior wall such that the barrier wall and the sleeve define a sleeve bottom gap; and a purge outlet defined in the barrier wall.

7. The fluid catalytic cracking apparatus of claim 1 further comprising:

a purge outlet positioned between the sleeve and the stripper exterior wall.

8. The fluid catalytic cracking apparatus of claim 1 wherein the sleeve is affixed to the reactor catalyst collection area.

9. The fluid catalytic cracking apparatus of claim 8 wherein the sleeve comprises a sleeve bottom end, and wherein the sleeve bottom end floats within the stripper.

10. The fluid catalytic cracking apparatus of claim 1 further comprising:

a barrier wall affixed to the stripper exterior wall, wherein the barrier wall is positioned such that the barrier wall and the sleeve define a sleeve bottom gap.

11. The fluid catalytic cracking apparatus of claim 1 wherein the sleeve comprises a sleeve sloped section affixed to the reactor catalyst collection area and a sleeve vertical section coupled to the sleeve sloped section, the fluid catalytic cracking apparatus further comprising:

a perforated hole defined in the sleeve sloped section.

12. The fluid catalytic cracking apparatus of claim 1 further comprising:

a flow aid positioned between the riser and the sleeve.

13. The fluid catalytic cracking apparatus of claim 1 wherein the reactor catalyst collection area comprises a catalyst collection area sloped wall, and wherein the sleeve comprises a sleeve sloped section affixed to the catalyst collection area sloped wall, and wherein a slope of the catalyst collection area sloped wall is within about 5 degrees of the slope of the sleeve sloped section.

14. The fluid catalytic cracking apparatus of claim 1 further comprising:

a regenerator fluidly coupled to the stripper and to the riser, wherein the regenerator is configured to receive a catalyst from the stripper and transfer the catalyst to the riser.

15. A fluid catalytic cracking apparatus comprising:

a riser comprising a riser outlet;

a reactor catalyst collection area, wherein the riser outlet is positioned within the reactor catalyst collection area, and wherein the reactor catalyst collection area comprises a catalyst collection area sloped wall;

a stripper coupled to the catalyst collection area sloped wall, wherein the stripper comprises a stripper exterior wall;

a sleeve positioned within the stripper exterior wall; and a barrier wall affixed to the stripper exterior wall, such that the barrier wall and the sleeve define a sleeve bottom gap.

16. The fluid catalytic cracking apparatus of claim 15 further comprising:

a sleeve vertical section coupled to the sleeve sloped section, wherein the sleeve vertical section is positioned between the riser and a stripper exterior wall.

17. The fluid catalytic cracking apparatus of claim 16 further comprising:

a stripper gas distributor positioned between the riser and the stripper exterior wall, wherein the stripper gas distributor is configured to direct a stripping gas between the riser and the sleeve vertical section.

18. The fluid catalytic cracking apparatus of claim 15 wherein a slope of the sleeve sloped section is within about 5 degrees of the slope of the catalyst collection area sloped wall.

19. The fluid catalytic cracking apparatus of claim 15 further comprising:

a regenerator; and a spent catalyst transfer line fluidly coupling the stripper to the regenerator.

20. A method of cracking hydrocarbons comprising the steps of:

contacting a hydrocarbon stream with a catalyst in a riser at cracking conditions to produce a riser effluent;

separating the riser effluent from the catalyst in a reactor catalyst separator;

collecting the catalyst in a reactor catalyst collection area; and stripping hydrocarbons from the catalyst in a stripper, wherein the stripper comprises a space between a sleeve and a stripper exterior wall, the space containing a refractory material, ceramic fiber blanket and/or other non-reactive packing material positioned between the sleeve and the stripper exterior wall.

* * * * *